United States Patent
Matsunaga et al.

(10) Patent No.: US 11,077,849 B2
(45) Date of Patent: Aug. 3, 2021

(54) VEHICLE CONTROL SYSTEM, VEHICLE CONTROL METHOD, AND STORAGE MEDIUM

(71) Applicant: HONDA MOTOR CO., LTD., Tokyo (JP)

(72) Inventors: Hideki Matsunaga, Wako (JP); Masamitsu Tsuchiya, Wako (JP); Yasuharu Hashimoto, Wako (JP); Etsuo Watanabe, Wako (JP); Ryoma Taguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 185 days.

(21) Appl. No.: 16/283,942

(22) Filed: Feb. 25, 2019

(65) Prior Publication Data

US 2019/0263398 A1 Aug. 29, 2019

(30) Foreign Application Priority Data

Feb. 27, 2018 (JP) .............................. JP2018-033686

(51) Int. Cl.
*B60W 30/095* (2012.01)
*G06K 9/00* (2006.01)
(Continued)

(52) U.S. Cl.
CPC ........ *B60W 30/0956* (2013.01); *B60W 40/04* (2013.01); *G05D 1/0088* (2013.01);
(Continued)

(58) Field of Classification Search
CPC ............ G05D 1/00; G05D 1/02; G05D 1/021; G05D 1/0088; G05D 1/0246; G05D 2201/0213; G06K 9/00; G06K 9/00624; G06K 9/00791; G06K 9/00362; G06K 9/00369; G06K 9/00805; B60W 30/00;
(Continued)

(56) References Cited

U.S. PATENT DOCUMENTS

2016/0272207 A1* 9/2016 Dolgov ................. G01S 17/931
2018/0178784 A1* 6/2018 Ohta ....................... B60T 7/042

FOREIGN PATENT DOCUMENTS

JP          2000-003499        1/2000
WO    WO-2018132607 A2 *      7/2018 ........... G05D 1/0253

* cited by examiner

*Primary Examiner* — Geepy Pe
*Assistant Examiner* — Michael Allen Brace, Jr.
(74) *Attorney, Agent, or Firm* — Amin, Turocy & Watson, LLP

(57) ABSTRACT

A vehicle control system including: a recognizer that is configured to recognize a surroundings status of a vehicle; and a driving controller that is configured to control an acceleration and steering of the vehicle on the basis of the surroundings status recognized by the recognizer, wherein, in a case in which a plurality of pedestrians are recognized in an advancement direction of the vehicle by the recognizer, the driving controller is configured to executes follow control for following the plurality of pedestrians and is configured to determines details of the follow control on the basis of a behavior of a nearest pedestrian who is closest to the vehicle among the plurality of pedestrians and a behavior of a second pedestrian who is a monitoring target other than the nearest pedestrian among the plurality of pedestrians.

12 Claims, 11 Drawing Sheets

(51) Int. Cl.
*G05D 1/02* (2020.01)
*G05D 1/00* (2006.01)
*B60W 40/04* (2006.01)

(52) U.S. Cl.
CPC ....... *G05D 1/0246* (2013.01); *G06K 9/00369* (2013.01); *G06K 9/00805* (2013.01); *B60W 2554/00* (2020.02); *G05D 2201/0213* (2013.01)

(58) Field of Classification Search
CPC .... B60W 30/08; B60W 30/09; B60W 30/095; B60W 30/0956; B60W 40/00; B60W 40/02; B60W 40/04; B60W 2554/00
See application file for complete search history.

VEHICLE CONTROL SYSTEM, VEHICLE CONTROL METHOD, AND STORAGE MEDIUM

CROSS-REFERENCE TO RELATED APPLICATION

Priority is claimed on Japanese Patent Application No. 2018-033686, filed Feb. 27, 2018, the content of which is incorporated herein by reference.

BACKGROUND

Field of the Invention

The present invention relates to a vehicle control system, a vehicle control method, and a storage medium.

Description of Related Art

Conventionally, a system detecting pedestrians using a laser radar has been disclosed (Japanese Unexamined Patent Application, First Publication No. 2000-3499). This system receives light reflected from an object in accordance with emission of a radar and extracts a pedestrian or a group of pedestrians on the basis of a result of light reception.

Meanwhile, in recent years, automated driving for automatically controlling a vehicle has been researched. However, in the document described above, no control of automated driving in a case in which a pedestrian or a group of pedestrians is present has been disclosed. For this reason, in a case in which a pedestrian or a group of pedestrians is present, there are cases in which a vehicle cannot be smoothly controlled in automated driving.

An aspect of the present invention is realized in consideration of such situations, and one object thereof is to provide a vehicle control system, a vehicle control method, and a storage medium capable of more smoothly controlling a vehicle.

SUMMARY

A vehicle control system, a vehicle control method, and a storage medium according to the present invention employ the following configurations.

(1): A vehicle control system according to one aspect of the present invention is a vehicle control system including: a recognizer that is configured to recognize a surroundings status of a vehicle; and a driving controller that is configured to control an acceleration and steering of the vehicle based on the surroundings status recognized by the recognizer, wherein, in a case in which a plurality of pedestrians are recognized in an advancement direction of the vehicle by the recognizer, the driving controller is configured to execute follow control for following the plurality of pedestrians and is configured to determine details of the follow control based on a behavior of a nearest pedestrian who is closest to the vehicle among the plurality of pedestrians and a behavior of a second pedestrian who is a monitoring target other than the nearest pedestrian among the plurality of pedestrians.

(2): In the aspect (1) described above, the driving controller is configured to follow the nearest pedestrian in a case in which a distance between the nearest pedestrian and the other pedestrian who is the monitoring target is equal to or longer than a predetermined distance.

(3): In the aspect (2) described above, in a case in which the distance between the nearest pedestrian and the second pedestrian who is the monitoring target is equal to or longer than the predetermined distance, the driving controller is configured to determine details of the follow control based on the basis of the behavior of the nearest pedestrian without taking the behavior of the second pedestrian who is the monitoring target into account.

(4): In any one of the aspects (1) to (3) described above, in a case in which a speed of the second pedestrian who is the monitoring target is lower than a speed of the nearest pedestrian by a predetermined speed or more, the driving controller is configured to change changes details of the follow control.

(5): In the aspect (4) described above, when the details of the follow control are changed, the driving controller is configured to change an inter-vehicle distance between a reference position set for the plurality of pedestrians and the vehicle from a first inter-vehicle distance to a second inter-vehicle distance that is longer than the first inter-vehicle distance or changes an acceleration or a speed of the vehicle from a first degree to a second degree that is lower than the first degree.

(6): In any one of the aspects (1) to (5) described above, in a case in which a relative speed between the nearest pedestrian and the second pedestrian who is the monitoring target changes by a predetermined speed or more, the driving controller is configured to move the vehicle in a lateral direction.

(7): In the aspect (6) described above, the driving controller is configured to move the vehicle in a direction opposite to a side on which the nearest pedestrian has deviated onto a road.

(8): In any one of the aspects (1) to (7) described above, the second pedestrian is a pedestrian present immediately before the nearest pedestrian.

(9): In the aspect (8) described above, the recognizer excludes a pedestrian who is not present within a specific range acquired by extending a width area set for the nearest pedestrian in the advancement direction from other pedestrians who are monitoring targets.

(10): In any one of the aspects (1) to (9) described above, the other pedestrians who are the monitoring targets are a first pedestrian present immediately before the nearest pedestrian and a second pedestrian present immediately before the first pedestrian, and, in a case in which the first pedestrian and the second pedestrian satisfy a first specific condition, and the nearest pedestrian and the first pedestrian satisfy a second specific condition, which is a condition regarding achievement that is looser than the first specific condition, the driving controller is configured to changes details of the follow control.

(11): A vehicle control method according to one aspect of the present invention is a vehicle control method using a vehicle control device, the vehicle control method including: recognizing a surroundings status of a vehicle; controlling an acceleration and steering of the vehicle based on the basis of the recognized surroundings status; executing follow control for following a plurality of pedestrians in a case in which the plurality of pedestrians are recognized in an advancement direction of the vehicle; and changing details of the follow control based on the basis of a behavior of a nearest pedestrian who is closest to the vehicle among the plurality of pedestrians and a behavior of a second pedestrian who is a monitoring target other than the nearest pedestrian among the plurality of pedestrians.

(12): A storage medium according to one aspect of the present invention is a non-transitory computer-readable storage medium that stores a computer program to be executed by a computer to perform at least: recognize a surroundings status of a vehicle; control an acceleration and steering of the vehicle based on the recognized surroundings status; execute follow control for following a plurality of pedestrians in a case in which the plurality of pedestrians are recognized in an advancement direction of the vehicle; and change details of the follow control based on a behavior of a nearest pedestrian who is closest to the vehicle among the plurality of pedestrians and a behavior of a second pedestrian who is a monitoring target other than the nearest pedestrian among the plurality of pedestrians.

According to the aspects (1), (4), (5), and (8) to (12) described above, a vehicle can be controlled more smoothly.

According to the aspects (2) and (3) described above, in a case in which a distance between a nearest pedestrian and the second pedestrian is equal to or longer than a predetermined distance, the second pedestrian is not taken into account, and accordingly, the processing load can be reduced.

According to the aspects (6) and (7) described above, by moving the vehicle in a lateral direction, automated driving in consideration of the vicinity can be realized.

DETAILED DESCRIPTION OF THE INVENTION

Hereinafter, a vehicle control device, a vehicle control method, and a storage medium according to embodiments of the present invention will be described with reference to the drawings.

First Embodiment

[Entire Configuration]

Figure 1:
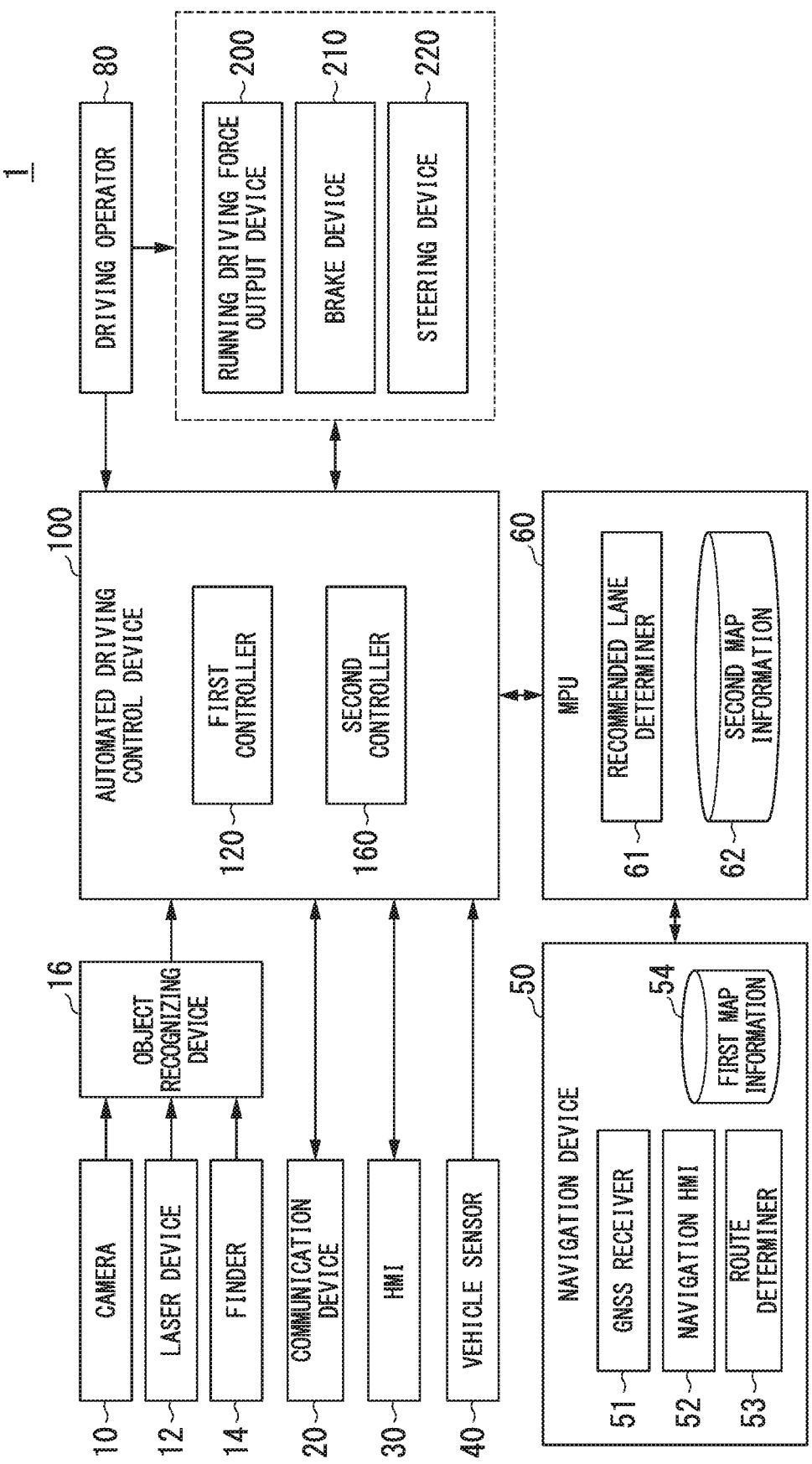
FIG. 1 is a configuration diagram of a vehicle system using a vehicle control device according to an embodiment.

FIG. 1 is a configuration diagram of a vehicle system 1 using a vehicle control device according to an embodiment. A vehicle in which the vehicle system 1 is mounted is, for example, a vehicle having two wheels, three wheels, four wheels, or the like, and a driving source thereof is an internal combustion engine such as a diesel engine or a gasoline engine, an electric motor, or a combination thereof. The electric motor operates using power generated using a power generator connected to an internal combustion engine or discharge power of a secondary cell or a fuel cell.

The vehicle system 1, for example, includes a camera 10 (camera 10A and camera 10B), a radar device 12, a finder 14, an object recognizing device 16, a communication device 20, a human machine interface (HMI) 30, a vehicle sensor 40, a navigation device 50, a map positioning unit (MPU) 60, a driving operator 80, an automated driving control device 100, a running driving force output device 200, a brake device 210, and a steering device 220. Such devices and units are interconnected using a multiplex communication line such as a controller area network (CAN) communication line, a serial communication line, a radio communication network, or the like. The configuration shown in FIG. 1 is merely one example, and thus, a part of the configuration may be omitted, and, furthermore, other components may be added thereto.

The camera 10, for example, is a digital camera using a solid-state imaging device such as a charge coupled device (CCD) or a complementary metal oxide semiconductor (CMOS). The camera 10 is installed at arbitrary places on a vehicle (hereinafter, referred to as a subject vehicle M) in which the vehicle system 1 is mounted. In a case in which the side in front is to be imaged, the camera 10 is installed at an upper part of a front windshield, a rear face of a rear-view mirror, or the like. The camera 10, for example, repeatedly images the vicinity of the subject vehicle M periodically. The camera 10 may be a stereo camera.

The radar device 12 emits radiowaves such as millimeter waves to the vicinity of the subject vehicle M and detects at least a position of (a distance and an azimuth to) an object by detecting radiowaves (reflected waves) reflected by the object. The radar device 12 is installed at arbitrary places on the subject vehicle M. The radar device 12 may detect a position and a speed of an object using a frequency modulated continuous wave (FM-CW) system.

The finder 14 is a light detection and ranging (LIDAR). The finder 14 emits light to the vicinity of the subject vehicle M and measures scattering light generated in accordance with the emitted light. The finder 14 detects a distance to a target on the basis of a time from light emission to light reception. The emitted light, for example, is a pulse-form laser light. The finder 14 is mounted at an arbitrary position on the subject vehicle M.

The object recognizing device 16 may perform a sensor fusion process on results of detection using some or all of the camera 10, the radar device 12, and the finder 14, thereby allowing recognition of a position, a type, a speed, and the like of an object. The object recognizing device 16 outputs a result of recognition to the automated driving control device 100. The object recognizing device 16 may output results of detection using the camera 10, the radar device 12, and the finder 14 to the automated driving control device 100 as they are. The object recognizing device 16 may be omitted from the vehicle system 1.

The communication device 20, for example, communicates with other vehicles in the vicinity of the subject vehicle M using a cellular network, a Wi-Fi network, Bluetooth (registered trademark), dedicated short range communication (DSRC), or the like or communicates with various server apparatuses through a radio base station.

The HMI 30 presents various types of information to an occupant of the subject vehicle M and receives an input operation performed by a vehicle occupant. The HMI 30 may include various display devices, a speaker, a buzzer, a touch panel, switches, keys, and the like.

The vehicle sensor 40 includes a vehicle speed sensor that detects a speed of the subject vehicle M, an acceleration sensor that detects an acceleration, a yaw rate sensor that detects an angular velocity around a vertical axis, an azimuth sensor that detects the azimuth of the subject vehicle M, and the like.

The navigation device 50, for example, includes a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 identifies a position of a subject vehicle M on the basis of signals received from GNSS satellites. The position of the subject vehicle M may be identified or supplemented by an inertial navigation system (INS) using an output of the vehicle sensor 40. The navigation HMI 52 includes a display device, a speaker, a touch panel, a key, and the like. A part or all of the navigation HMI 52 and the HMI 30 described above may be configured to be shared. The route determiner 53, for example, determines a route from a position of the subject vehicle M identified by the GNSS receiver 51 (or an input arbitrary position) to a destination input by a vehicle occupant using the navigation HMI 52 (hereinafter referred to as a route on a map) by referring to the first map information 54. The first map information 54, for example, is information in which a road form is represented by respective links representing a road and respective nodes connected using the links. The first map information 54 may include a curvature of each road, point of interest (POI) information, and the like. The route on the map is output to the MPU 60. The navigation device 50 may perform route guidance using the navigation HMI 52 on the basis of the route on the map. Furthermore, the navigation device 50, for example, may be implemented by a function of a terminal device such as a smartphone or a tablet terminal held by a vehicle occupant. The navigation device 50 may transmit a current location and a destination to a navigation server through the communication device 20 and acquire a route that is equivalent to the route on the map from the navigation server.

The MPU 60, for example, includes a recommended lane determiner 61 and stores second map information 62 in a storage device such as an HDD or a flash memory. The recommended lane determiner 61 divides a route on the map provided from the navigation device 50 into a plurality of blocks (for example, divides the route for every 100 [m] in the advancement direction of the vehicle) and determines a recommended lane for each block by referring to the second map information 62. The recommended lane determiner 61 determines on which of lanes numbered from the left side to run. In a case in which a branching place is present in the route on the map, the recommended lane determiner 61 determines a recommended lane such that the subject vehicle M can run on a reasonable route for advancement to a branching destination.

The second map information 62 is map information having an accuracy higher than that of the first map information 54. The second map information 62, for example, includes information of the center of respective lanes, information on boundaries between lanes, or the like. In addition, in the second map information 62, road information, traffic regulations information, address information (address and zip code), facilities information, telephone number information, and the like may be included. As the communication device 20 communicates with another device, the second map information 62 may be updated as needed.

The driving operator 80, for example, includes an acceleration pedal, a brake pedal, a shift lever, a steering wheel, a steering wheel variant, a joystick, and other operators. A sensor detecting the amount of an operation or the presence/absence of an operation is installed in the driving operator 80, and a result of the detection is output to the automated driving control device 100 or some or all of the running driving force output device 200, the brake device 210, and the steering device 220.

The automated driving control device 100, for example, includes a first controller 120, and a second controller 160. Each of the first controller 120 and second controller 160, for example, is implemented by a hardware processor such as a central processing unit (CPU) executing a program (software). In addition, some or all of such constituent elements may be implemented by hardware (a circuit; including circuitry) such as a large scale integration (LSI), an application specific integrated circuit (ASIC), a field-programmable gate array (FPGA), or a graphics processing unit (GPU) or may be implemented by cooperation between software and hardware. The program may be stored in a storage device such as an HDD or a flash memory of the automated driving control device 100 in advance or may be stored in a storage medium (non-transitory storage medium) such as a DVD or a CD-ROM that can be loaded or unloaded and installed in the HDD or the flash memory of the automated driving control device 100 by loading the storage medium into a drive device.

Figure 2:
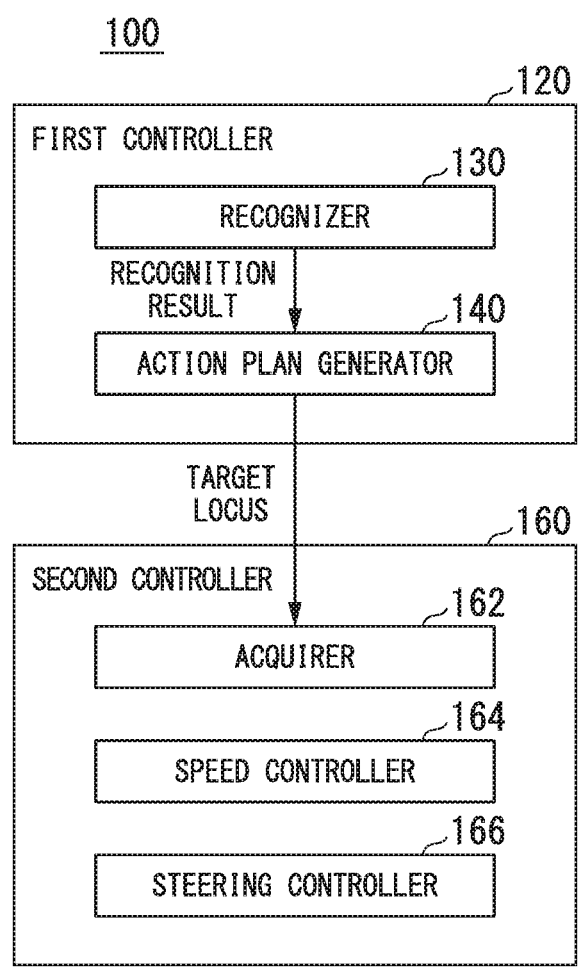
FIG. 2 is a functional configuration diagram of a first controller and a second controller.

FIG. 2 is a functional configuration diagram of the first controller 120 and the second controller 160. The first controller 120, for example, includes a recognizer 130 and an action plan generator 140. A combination of the action plan generator 140 and the second controller 160 is one example of a "driving controller." The first controller 120, for example, simultaneously implements functions using artificial intelligence (AI) and functions using a model provided in advance. For example, a function of "recognizing an intersection" may be implemented by executing recognition of an intersection using deep learning or the like and recognition based on conditions given in advance (a signal, road markings, and the like that can be used for pattern matching are present) at the same time, assigning scores to processing results of both recognition processes, and comprehensively evaluating the processing results to which the scores have been assigned. Accordingly, the reliability of automated driving is secured.

The recognizer 130 recognizes states such as a position, a speed, an acceleration, and the like of each object present in the vicinity of the subject vehicle M on the basis of information input from the camera 10, the radar device 12, and the finder 14 through the object recognizing device 16. The position of an object, for example, is recognized as a position on an absolute coordinate system having a representative point (the center of gravity, the center of a driving shaft, or the like) of the subject vehicle M as its origin and is used for control. The position of an object may be represented as a representative point such as the center of gravity or a corner of an object or may be represented as a representative area. A "state" of an object may include an acceleration, a jerk, or an "action state" (for example, whether or not the object is changing lanes or will change lanes) of an object.

The recognizer 130, for example, recognizes a lane (running lane) in which the subject vehicle M is running. For example, the recognizer 130 may recognize a running lane by comparing a pattern of road partition lines acquired from the second map information 62 (for example, an array of solid lines and broken lines) with a pattern of road partition lines in the vicinity of the subject vehicle M that has been recognized from an image captured by the camera 10. The recognizer 130 is not limited to recognizing road partition lines and may recognize a running lane by recognizing running lane boundaries (road boundaries) including a road partition line, a road shoulder, curbstones, a median strip, a guardrail, and the like. In the recognition, the position of the subject vehicle M acquired from the navigation device 50 or a result of the process executed by an INS may be additionally taken into account. In addition, the recognizer 130 may recognize a temporary stop line, an obstacle, a red light, a tollgate, and other road events.

When a running lane is recognized, the recognizer 130 recognizes a position and a posture of the subject vehicle M with respect to the running lane. The recognizer 130, for example, may recognize a deviation of a reference point on the subject vehicle M from the center of the lane and an angle of the advancement direction of the subject vehicle M formed with respect to a line along the center of the lane as a relative position and a posture of the subject vehicle M with respect to the running lane. Instead of this, the recognizer 130 may recognize a position of a reference point on the subject vehicle M with respect to a one side end part (a road partition line or a road boundary) of the running lane or the like as a relative position of the subject vehicle M with respect to the running lane.

The action plan generator 140 basically runs on a recommended lane determined by the recommended lane determiner 61 and generates a target locus along which the subject vehicle M will run automatically (independently of responding to a driver's operation) in the future such that a surroundings status of the subject vehicle M can be responded to. The target locus, for example, includes a speed element. For example, the target locus is represented by sequentially aligning places (locus points) at which the subject vehicle M is to arrive. A locus point is a place at which the subject vehicle M will arrive at respective predetermined running distances (for example, about every several [m]) as distances along the road, and separately, a target speed and a target acceleration for each of predetermined sampling times (for example, a fraction of a [sec]) are generated as a part of the target locus. A locus point may be a position at which the subject vehicle M will arrive at a sampling time for each of predetermined sampling times. In such a case, information of a target speed or a target acceleration is represented using intervals between the locus points.

The action plan generator 140 may set an event of automated driving when a target locus is generated. As events of automated driving, there are a constant-speed running event, a low-speed following running event, a lane change event, a branching event, a merging event, an overtaking event, and the like. The action plan generator 140 generates a target locus according to an operating event.

The second controller 160 performs control of the running driving force output device 200, the brake device 210, and the steering device 220 such that the subject vehicle M passes along a target locus generated by the action plan generator 140 at a scheduled time.

The second controller 160, for example, includes an acquirer 162, a speed controller 164, and a steering controller 166. The acquirer 162 acquires information of a target locus (a locus point) generated by the action plan generator 140 and stores the target locus information in a memory (not shown). The speed controller 164 controls the running driving force output device 200 or the brake device 210 on the basis of a speed element accompanying the target locus stored in the memory. The steering controller 166 controls the steering device 220 in accordance with a degree of curvature of the target locus stored in the memory. The processes of the speed controller 164 and the steering controller 166, for example, are implemented by a combination of feed forward control and feedback control. For example, the steering controller 166 may execute feed forward control according to the curvature of a road in front of the subject vehicle M and feedback control based on a deviation from the target locus in combination.

The running driving force output device 200 outputs a running driving force (torque) used for a vehicle to run to driving wheels. The running driving force output device 200, for example, includes a combination of an internal combustion engine, an electric motor, a transmission, and the like and an ECU controlling these components. The ECU controls the components described above in accordance with information input from the second controller 160 or information input from the driving operator 80.

The brake device 210, for example, includes a brake caliper, a cylinder that delivers hydraulic pressure to the brake caliper, an electric motor that generates hydraulic pressure in the cylinder, and a brake ECU. The brake ECU performs control of the electric motor in accordance with information input from the second controller 160 or information input from the driving operator 80 such that a brake torque according to a brake operation is output to each vehicle wheel. The brake device 210 may include a mechanism delivering hydraulic pressure generated in accordance with an operation on the brake pedal included in the driving operators 80 to the cylinder through a master cylinder as a backup. The brake device 210 is not limited to the configuration described above and may be an electronically-controlled hydraulic brake device that delivers hydraulic pressure in the master cylinder to a cylinder by controlling an actuator in accordance with information input from the second controller 160.

The steering device 220, for example, includes a steering ECU and an electric motor. The electric motor, for example, changes the direction of the steering wheel by applying a force to a rack and pinion mechanism. The steering ECU changes the direction of the steering wheel by driving an electric motor in accordance with information input from the second controller 160 or information input from the driving operator 80.

[Control for Following Pedestrian]

In a case in which the recognizer 130 recognizes a plurality of pedestrians in the advancement direction of a subject vehicle, the action plan generator 140 executes following control for following the plurality of pedestrians and determines details of the following control on the basis of a behavior of a pedestrian nearest to the subject vehicle M among the plurality of pedestrians and a behavior of a second pedestrian, who is a monitoring target, other than the nearest pedestrian among the plurality of pedestrians.

The "following control for following a plurality of pedestrians" is, for example, control for causing the subject vehicle M to run in a state in which a distance between one reference position (for example, a position of the nearest pedestrian) set for the plurality of pedestrians and the subject vehicle M is maintained to be a predetermined distance. Here, a "behavior" is, for example, a walking speed, a walking direction, and the like of a pedestrian. "Determining details of following control" is determining a distance between a reference position at the time of following (for example, a pedestrian who is a following target) and the subject vehicle M, determining a speed and an acceleration at the time of following, or determining a position in the lateral direction (a width direction of the vehicle) with respect to a following target. For determining "being nearest", for example, a distance from an outer circumferential surface of the subject vehicle M, a distance from the center of gravity of the vehicle, or a distance from a recognizer of the vehicle (for example, the camera 10, the radar device 12, the finder 14, or the like) may be used as a reference.

Instead of "in a case in which the recognizer 130 recognizes a plurality of pedestrians in the advancement direction of the subject vehicle", "in a case in which the recognizer 130 recognizes a plurality of pedestrians in a locus along which the subject vehicle will run (or an area acquired by adding a predetermined with to the locus)", the action plan generator 140 may determine details of the follow control described above. In other words, in a case in which a plurality of pedestrians are recognized on the side of an opposing lane in the advancement direction of the subject vehicle, the action plan generator 140 may not execute a process to be described below.

Figure 3:
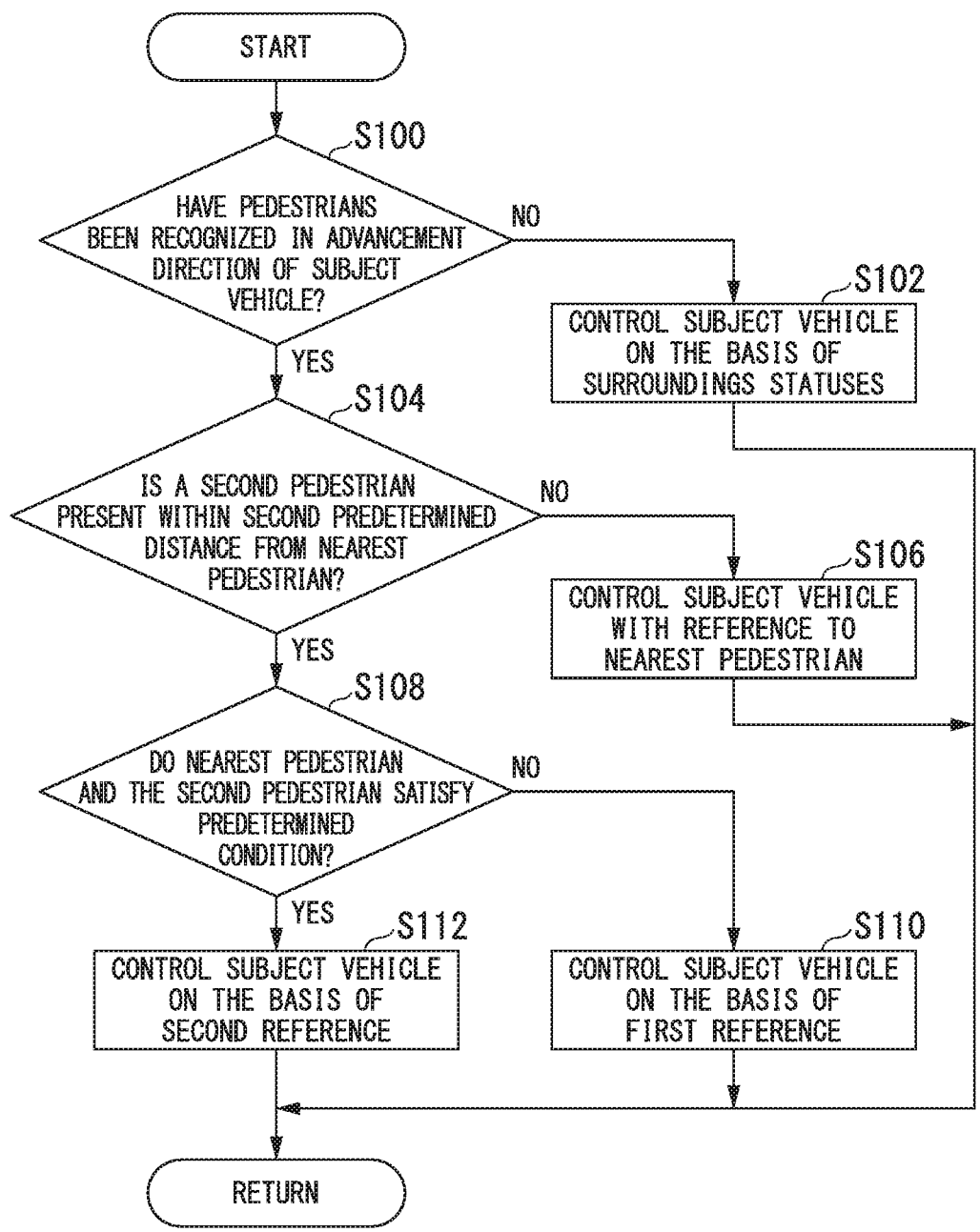
FIG. 3 is a flowchart showing one example of the flow of a process executed by the first controller.

FIG. 3 is a flowchart showing one example of the flow of a process executed by the first controller 120. First, the recognizer 130 determines whether or not a pedestrian has been recognized in the advancement direction of the subject vehicle M (Step S100). A pedestrian, for example, is a pedestrian present within a first predetermined distance d1 from the subject vehicle M and is a pedestrian advancing in the same direction as that of the subject vehicle M. In a case in which a pedestrian is not recognized in the advancement direction of the subject vehicle M, the action plan generator 140 controls the subject vehicle M on the basis of a surroundings status recognized by the recognizer 130 (Step S102).

On the other hand, in a case in which a pedestrian is recognized in the advancement direction of the subject vehicle M, the recognizer 130 determines whether or not a second pedestrian is present within a second predetermined distance d2 from the nearest pedestrian (Step S104). In a case in which the second pedestrian is not present within the second predetermined distance d2 from the nearest pedestrian, the action plan generator 140 controls the subject vehicle M using the nearest pedestrian as a reference (Step S106). In other words, in a case in which a distance between the nearest pedestrian and the second pedestrian that is a monitoring target is equal to or longer than a predetermined distance, the subject vehicle M is caused to follow the nearest pedestrian. Here, "controlling the subject vehicle M using the nearest pedestrian as a reference" is performing control of the subject vehicle M such that it runs in a state in which a distance between the nearest pedestrian and the subject vehicle M is maintained to be a first inter-vehicle distance.

Figure 4:
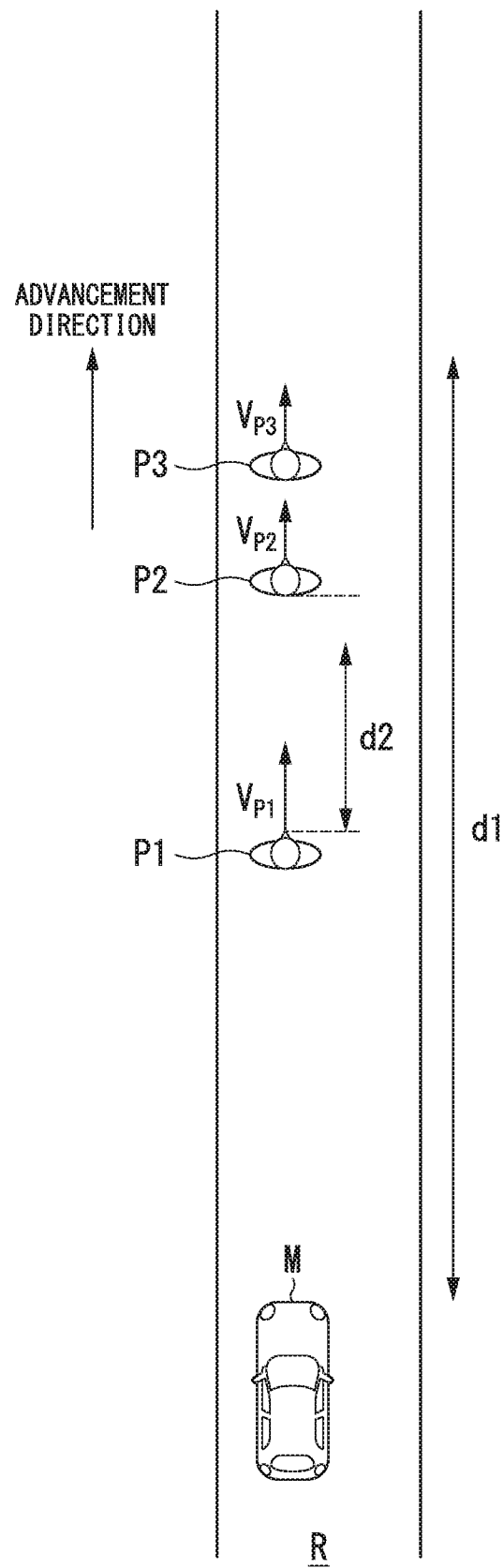
FIG. 4 is a diagram showing one example of a view in which the second pedestrian is not present within a second predetermined distance d2 from a nearest pedestrian.

FIG. 4 is a diagram showing one example of a view in which the second pedestrian is not present within the second predetermined distance d2 from the nearest pedestrian. In a case in which a subject vehicle M runs on a road R, it is assumed that pedestrians P1 to P3 are present in the advancement direction of the subject vehicle M. The pedestrians are walking in line in an order of the pedestrians P1, P2, and P3 from the subject vehicle M side in the advancement direction. In the view described above, a pedestrian who is the closest to the subject vehicle M is the nearest pedestrian P1. A distance between this nearest pedestrian P1 and the pedestrian P2 who is the closest to the nearest pedestrian P1 is equal to or longer than a second predetermined distance d2. In other words, the second pedestrian is not present within the second predetermined distance d2 from the nearest pedestrian P1. In this case, the action plan generator 140 performs control of the subject vehicle M such that it follows the nearest pedestrian P1.

Description will be continued with reference to FIG. 3. In a case in which the second pedestrian is present within the second predetermined distance d2 from the nearest pedestrian, the recognizer 130 determines whether or not the nearest pedestrian and the second pedestrian satisfy a predetermined condition (Step S108). Then, the action plan generator 140 changes details of the follow control on the basis of a result of the determination. In other words, the action plan generator 140 determines (or changes) details of the follow control on the basis of a behavior of the nearest pedestrian and a behavior of the second pedestrian.

Figure 5:
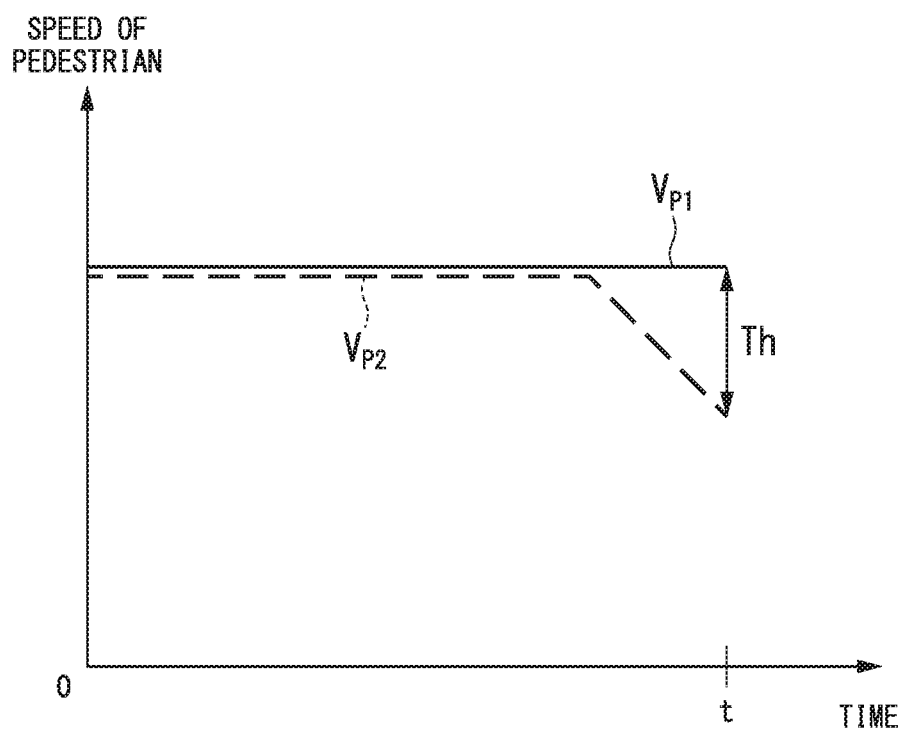
FIG. 5 is a diagram showing one example of changes in walking speeds of pedestrians.

Here, the "predetermined condition", for example, is a condition that a speed of the second pedestrian who is a monitoring target is lower than a speed of the nearest pedestrian by a predetermined speed or more. FIG. 5 is a diagram showing one example of changes in walking speeds of the pedestrian P1 and the pedestrian P2. A vertical axis of FIG. 5 represents the speeds of pedestrians, and a horizontal axis of FIG. 5 represents the time. A transition line $V_{P1}$ represented in FIG. 5 indicates a change in the speed of the nearest pedestrian P1, and a transition line $V_{P2}$ represented in FIG. 5 indicates a change in the speed of the pedestrian P2. For example, as at a time t, in a case in which the speed of the pedestrian P2 is lower than the speed of the pedestrian P1 by a threshold or more, it is determined that the nearest pedestrian and the second pedestrian satisfy a predetermined condition.

In a case in which the pedestrian P1 starts to run, and the speed of the pedestrian P1 is higher than the speed of the pedestrian P2 by a threshold or more, it may be determined that the nearest pedestrian and the second pedestrian satisfy a predetermined condition.

In a case in which the nearest pedestrian and the second pedestrian do not satisfy a predetermined condition, the action plan generator 140 controls the subject vehicle M on the basis of a first reference (Step S110). Here, "controlling the subject vehicle M on the basis of a first reference" is, for example, control of causing the subject vehicle M to run in a state in which a distance between a nearest pedestrian (a reference position set for a plurality of pedestrians) and the subject vehicle M is maintained at a predetermined distance (for example, a first inter-vehicle distance) (controlling the subject vehicle M with reference to the nearest pedestrian). Here, "controlling the subject vehicle M on the basis of the first reference" is control of causing the subject vehicle M to run in a state in which an acceleration or a speed of the subject vehicle M is maintained at a first degree.

In a case in which the nearest pedestrian and the second pedestrian satisfy a predetermined condition, the action plan generator 140 controls the subject vehicle M on the basis of a second reference (Step S112). In this way, a process of one routine of this flowchart ends.

Here, "controlling the subject vehicle M on the basis of a second reference" is controlling the subject vehicle M by changing details of follow control. For example, controlling the subject vehicle M on the basis of the second reference is changing of an inter-vehicle distance between a plurality of pedestrians and the subject vehicle M from a first inter-vehicle distance to a second inter-vehicle distance longer than the first inter-vehicle distance or changing of an acceleration or a speed of the subject vehicle M from a first degree to a second degree lower than the first degree.

Figure 6:
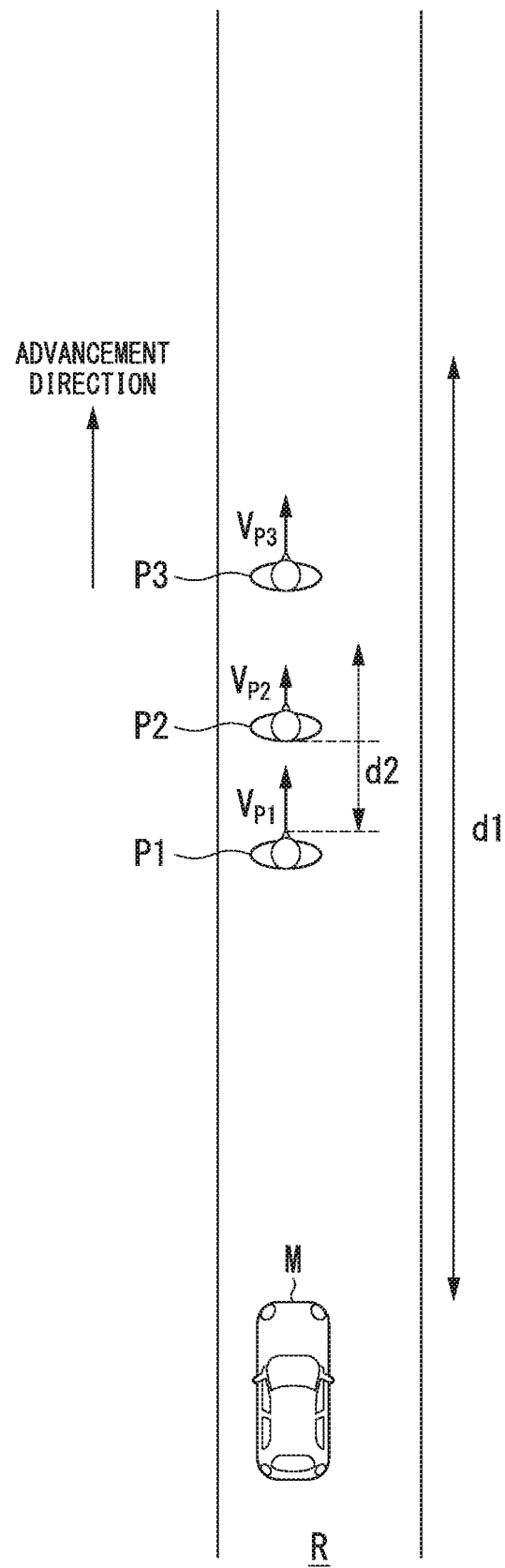
FIG. 6 is a diagram showing one example of a view in which a nearest pedestrian and the second pedestrian satisfy a predetermined condition.

FIG. 6 is a diagram showing one example of a view in which a nearest pedestrian and the second pedestrian satisfy a predetermined condition. In the view shown in FIG. 6, a pedestrian P2 is present within a second predetermined distance d2 from the nearest pedestrian. For example, in a case in which a speed of the pedestrian P2 is lower than a speed of the pedestrian P1 by a threshold or more, there are cases in which a behavior of the pedestrian P1 changes in accordance with a change in a behavior of the pedestrian P2. More specifically, there are cases in which the nearest pedestrian P1 stops or decreases the walking speed such that he does not come into contact with the pedestrian P2.

In this embodiment, even in a case in which details of follow control do not need to be changed in the behavior of the nearest pedestrian P1 (a case in which there is no change in the behavior of the pedestrian P1), in a case in which it is determined that there is a need to change details of the follow control on the basis of the behavior of the pedestrian P2, the action plan generator 140 changes the details of the follow control. As a result, the subject vehicle M can be controlled more smoothly.

In the example described above, although changing of an inter-vehicle distance, a speed, or an acceleration has been described as changing of details of the follow control, instead of (or in addition to) this, the subject vehicle M may be moved in a lateral direction. Here, the moving in the lateral direction, for example, is moving of the subject vehicle M in a direction opposite to a side on which the nearest pedestrian (or the second pedestrian) has deviated on a road.

Figure 7:
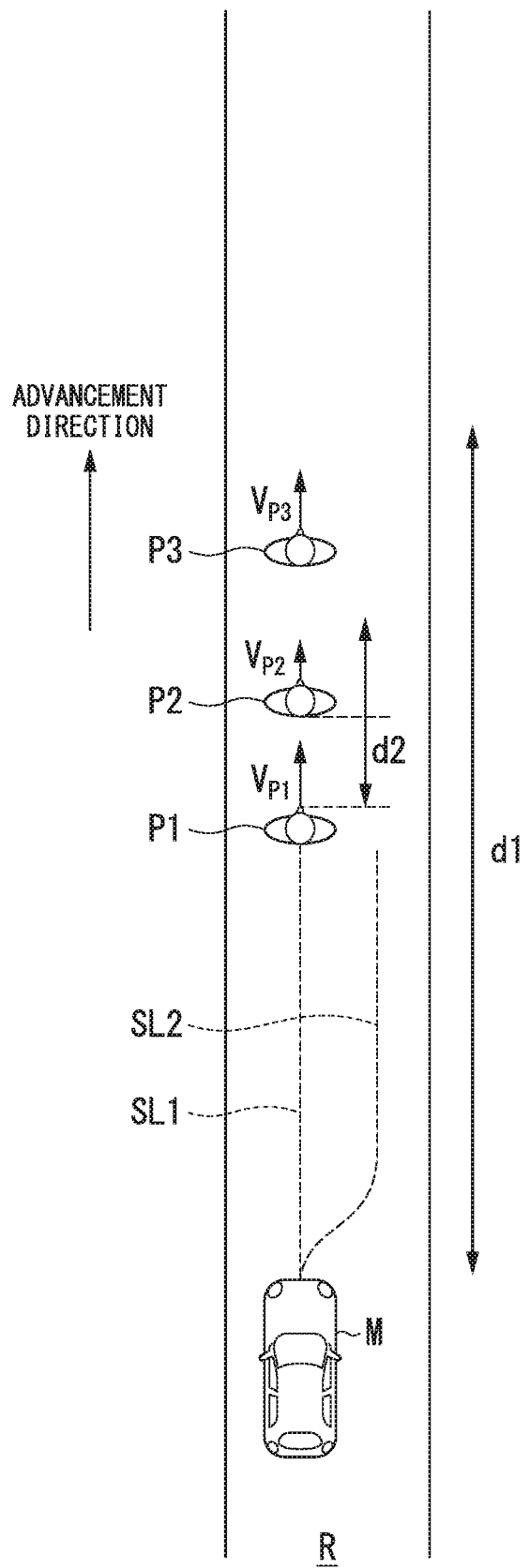
FIG. 7 is a diagram showing one example of a locus in a lateral direction along which a subject vehicle runs.

FIG. 7 is a diagram showing one example of a locus in a lateral direction along which a subject vehicle M runs. In the example shown in the drawing, "controlling the subject vehicle M on the basis of a first reference", for example, is controlling the subject vehicle M such that it runs along a first running line SL1. In the example shown in the drawing, "controlling the subject vehicle M on the basis of a second reference", for example, is controlling the subject vehicle M such that it runs along a second running line SL2.

The first reference line SL1 or the second reference line SL2 is a target locus when the subject vehicle M runs that is generated by the action plan generator 140. The subject vehicle M is controlled such that a reference position of the subject vehicle M (for example, the center of the subject vehicle M in the lateral direction) runs on a target locus.

Here, the "first reference line SL1", for example, is a target locus along which the subject vehicle M runs in a case in which the subject vehicle M is controlled with reference to the nearest pedestrian P1 (or a second pedestrian). In addition, the "second reference line SL2" is a target locus along which the subject vehicle M runs at a position further away from the nearest pedestrian P1 (or a second pedestrian P2 having a high possibility of becoming the nearest pedestrian) in the lateral direction than the first reference line SL1.

For example, in a case in which the speed of a second pedestrian P2 that is a monitoring target is lower than the speed of the nearest pedestrian P1 by a predetermined speed or more, the recognizer 130 predicts a timing at which the nearest pedestrian P1 overtakes the second pedestrian P2 on the basis of a distance between the nearest pedestrian P1 and the second pedestrian P2 and a relative speed between the nearest pedestrian P1 and the second pedestrian P2. Then, the action plan generator 140 moves the subject vehicle M in the lateral direction such that it runs along the second reference line SL2 a predetermined time before the nearest pedestrian P1 overtakes the second pedestrian P2 (or at an overtaking timing). From this, in a status in which the behavior of the second pedestrian P2 suddenly changes, and the second pedestrian P2 becomes the nearest pedestrian P1, the subject vehicle M can be controlled such that it moves to a position further away from the second pedestrian P2 of which the behavior has suddenly changed.

In this way, in a case in which the nearest pedestrian and a second pedestrian satisfy a predetermined condition, the subject vehicle M is controlled such that it runs along the second reference line SL2, and accordingly, a positional relation between the subject vehicle M and a pedestrian can be more appropriately changed. In this way, even in a case in which there is a change in the behavior of the pedestrian, the subject vehicle M can be controlled more smoothly.

According to the first embodiment described above, the action plan generator 140 changes details of follow control on the basis of a behavior of the nearest pedestrian who is the closest to the subject vehicle M from among a plurality of pedestrians and a behavior of a second pedestrian that is a monitoring target other than the nearest pedestrian among the plurality of pedestrians, whereby the vehicle can be controlled more smoothly.

Second Embodiment

Hereinafter, a second embodiment will be described. In the first embodiment, the subject vehicle M is controlled with the nearest pedestrian and a second pedestrian present immediately before the nearest pedestrian focused on. In the second embodiment, the subject vehicle M is controlled with a pedestrian present immediately before the second pedestrian described above focused on as well. Hereinafter, points different from those of the first embodiment will be described.

Figure 8:
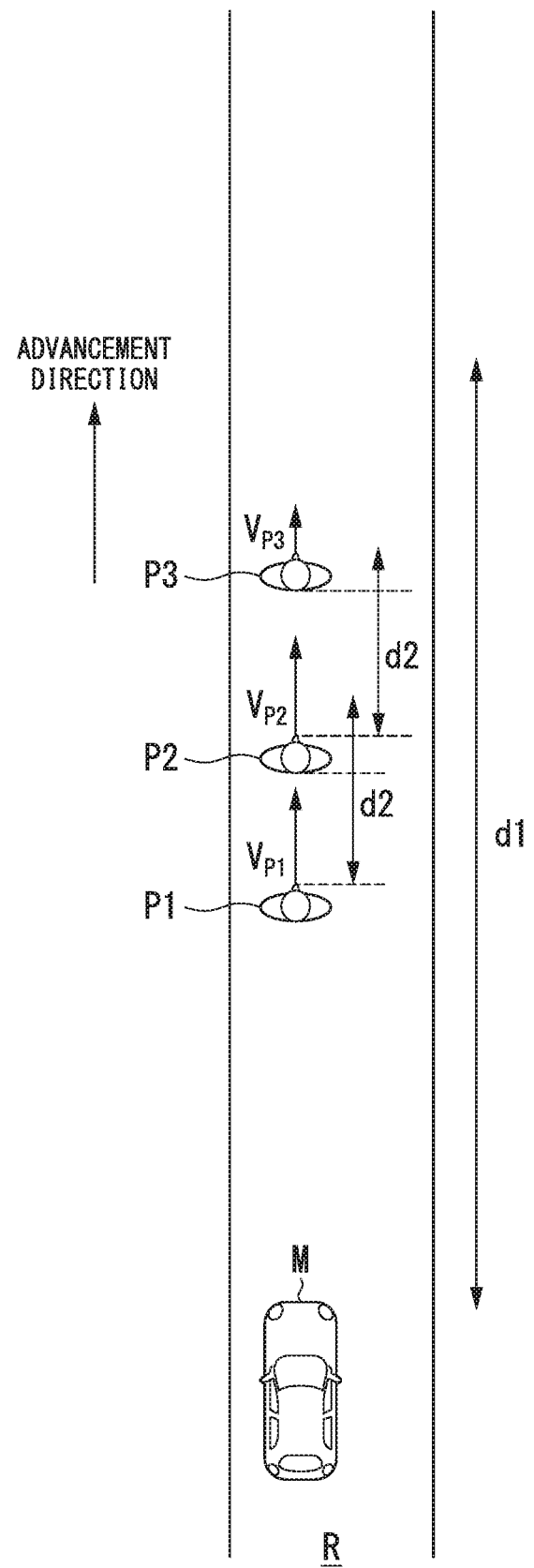
FIG. 8 is a diagram showing control according to a second embodiment.

FIG. 8 is a diagram showing control according to the second embodiment. In the view described above, a distance between the nearest pedestrian P1 and a pedestrian P2 who is the closest to the nearest pedestrian P1 and a distance between the pedestrian P2 and a pedestrian P3 present immediately before the pedestrian P2 are within a second predetermined distance d2. In this case, the action plan generator 140 performs control of the subject vehicle M such that it follows the pedestrian P1.

Then, even in a case in which the nearest pedestrian P1 and a second first pedestrian P2 do not satisfy a predetermined condition, in a case in which other pedestrians P2 and P3 satisfy a first specific condition, and the nearest pedestrian P1 and the first pedestrian P2 satisfy a second specific condition, the action plan generator 140 changes details of the follow control. Here, the "first specific condition", for example, is a condition that the speed of a second pedestrian P3 is lower than the speed of the first pedestrian P2 by a first predetermined speed or more, a condition that a distance between the first pedestrian P2 and the second pedestrian P3 is equal to or shorter than a first specific distance, or the like.

In addition, the "second specific condition", for example, is a condition that an achievement condition is looser than the first specific condition. The loose condition is a criterion that is looser than the first specific condition in relation to a distance between pedestrians, a difference between speeds, or a difference between accelerations. For example, the second specific condition is a condition that the speed of a first pedestrian P2 is lower than the speed of the nearest pedestrian P1 by a second predetermined speed or more. The second predetermined speed is a speed lower than a first predetermined speed set for the first specific condition. The second specific condition is a condition that a distance between the nearest pedestrian P1 and a pedestrian P2 present immediately before the nearest pedestrian P1 is equal to or shorter than a second specific distance. Here, the second specific distance is a distance longer than the first predetermined distance set for the first specific condition. The second specific condition may be the same as the predetermined condition described above.

Figure 9:
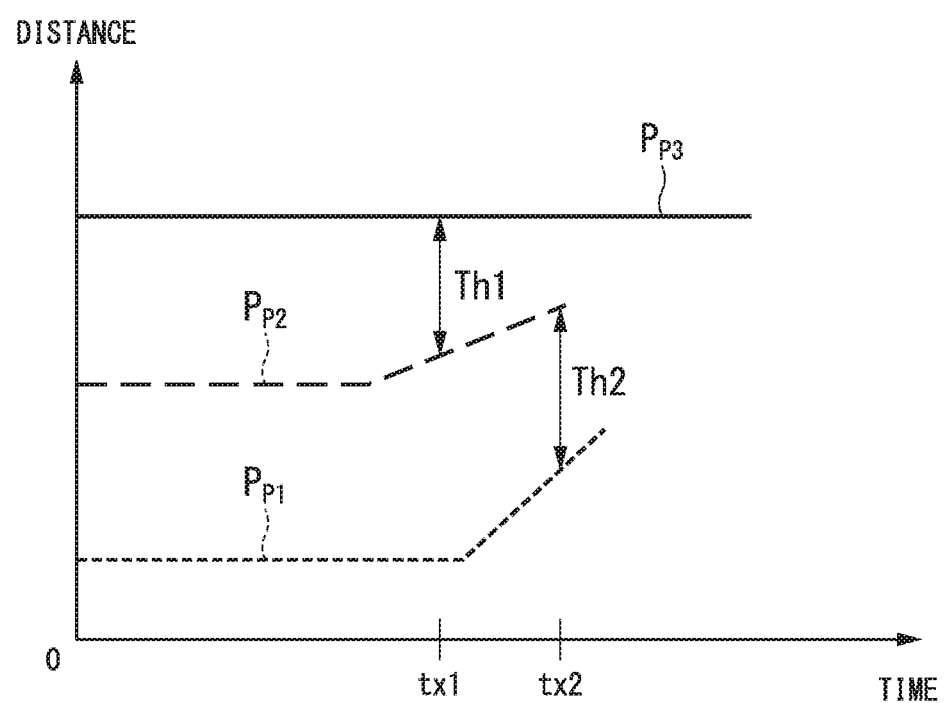
FIG. 9 is a diagram showing one example of a process according to the second embodiment.

FIG. 9 is a diagram showing one example of a process according to the second embodiment. A vertical axis of FIG. 9 represents a distance, and a horizontal axis of FIG. 9 represents a time. A transition line $P_{P1}$ shows a change in the position of the pedestrian P1, a transition line $P_{P2}$ shows a change in the position of the pedestrian P2, and a transition line $P_{P3}$ shows a change in the position of the pedestrian P3. FIG. 9 shows a change in the position of a second pedestrian with reference to the position of the pedestrian $P_{P3}$. In other words, FIG. 9 shows a distance between the pedestrian $P_{P1}$ and the pedestrian $P_{P3}$ and a distance between the pedestrian $P_{P2}$ and a pedestrian $P_{P3}$ that change in accordance with elapse of time.

For example, it is assumed that the pedestrian P2 and the pedestrian P3 move in the advancement direction with a distance exceeding a threshold Th1 maintained, and the pedestrian P1 and the pedestrian P2 move in the advancement direction with a distance exceeding a threshold Th2 (>threshold Th1) maintained. In this case, in a case in which the pedestrian P3 stops, and a distance between the pedestrian P2 and the pedestrian P3 becomes equal to or shorter than a threshold Th1 at a time tx1 in accordance with the influence thereof, it is determined that a first specific condition is satisfied.

In a state in which the first specific condition is satisfied, in a case in which the speed of the pedestrian P2 decreases, and a distance between the pedestrian P1 and the pedestrian P2 becomes equal to or shorter than a threshold Th2 at a time tx2 in accordance with the influence thereof, it is determined that a second specific condition is satisfied.

In this way, in a case in which the first specific condition and the second specific condition are satisfied, the action plan generator 140 changes details of the follow control. As described above, by taking the behaviors of other pedestrians other than the nearest pedestrian into account, the subject vehicle M can be controlled more smoothly.

According to the second embodiment described above, by also focusing on a pedestrian present immediately before a second pedestrian, the subject vehicle M can be controlled more smoothly.

Third Embodiment

Hereinafter, a third embodiment will be described. In the third embodiment, a pedestrian who is not present within a specific range acquired by extending a width area set for a nearest pedestrian in an advancement direction is excluded from other pedestrians.

Figure 10:
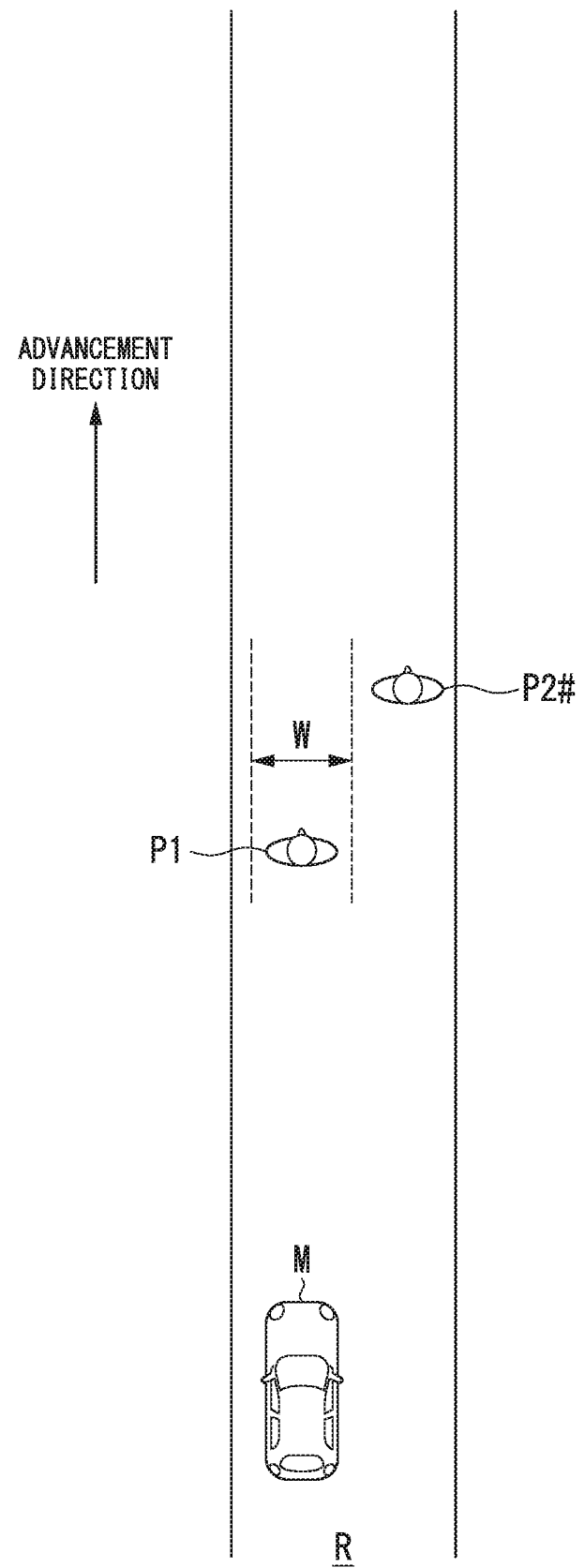
FIG. 10 is a diagram showing a specific range.

FIG. 10 is a diagram showing a specific range. The specific range is, for example, a range acquired by extending the width area W set for the nearest pedestrian in a direction in which a road extends. The width area is an area of a marginal width in a widthwise direction from an end part of the nearest pedestrian P1 in the widthwise direction. The specific range may be a locus (or an area acquired by adding a predetermined width to the locus) along which the subject vehicle is planned to run.

As shown in FIG. 10, a pedestrian P2# advancing in the advancement direction is excluded from other pedestrians. The reason for this is that, for example, even in a case in which the speed of the pedestrian P2# is lower than the speed of the pedestrian P1, the pedestrian P1 can advance in the advancement direction without being influenced by the pedestrian P2#.

In a case in which the pedestrian P1 and the pedestrian P2# approach each other (for example, in the case of being within a third predetermined distance shorter than a second predetermined distance), the pedestrian P2# may be handled as a second pedestrian who is a monitoring target. The reason for this is that, in this case, there is a possibility that the pedestrian P1 is influenced by the behavior of the pedestrian P2#.

A case in which another first pedestrian is present in the advancement direction of the nearest pedestrian P1, and another second pedestrian is present immediately before the first pedestrian will be considered. In this case, even in a case in which the first pedestrian is present within the specific range of the nearest pedestrian P1, and the second pedestrian is not present in the specific range, in a case in which the behavior of the second pedestrian has an influence on the behavior of the first pedestrian, the second pedestrian may be handled as a second pedestrian. Here, having an influence, for example, means that the second pedestrian is present within the specific range set for the first pedestrian.

According to the third embodiment described above, by changing details of the follow control on the basis of behaviors of pedestrians having influences on the behavior of the nearest pedestrian, the vehicle can be controlled more smoothly.

According to the embodiment described above, the automated driving control device 100 includes the recognizer 130 that recognizes a surroundings status of a vehicle and the action plan generator 140 that controls an acceleration and steering of the vehicle on the basis of the surroundings status recognized by the recognizer 130, and the action plan generator 140, in a case in which the recognizer 130 recognizes a plurality of pedestrians in an advancement direction of the vehicle, executes follow control for following the plurality of pedestrians and determines details of the follow control on the basis of the behavior of a nearest pedestrian who is closest to the vehicle among the plurality of pedestrians and the behavior of a second pedestrian who is a monitoring target other than the nearest pedestrian among the plurality of pedestrians, whereby the vehicle can be controlled more smoothly.

Hardware Configuration

Figure 11:
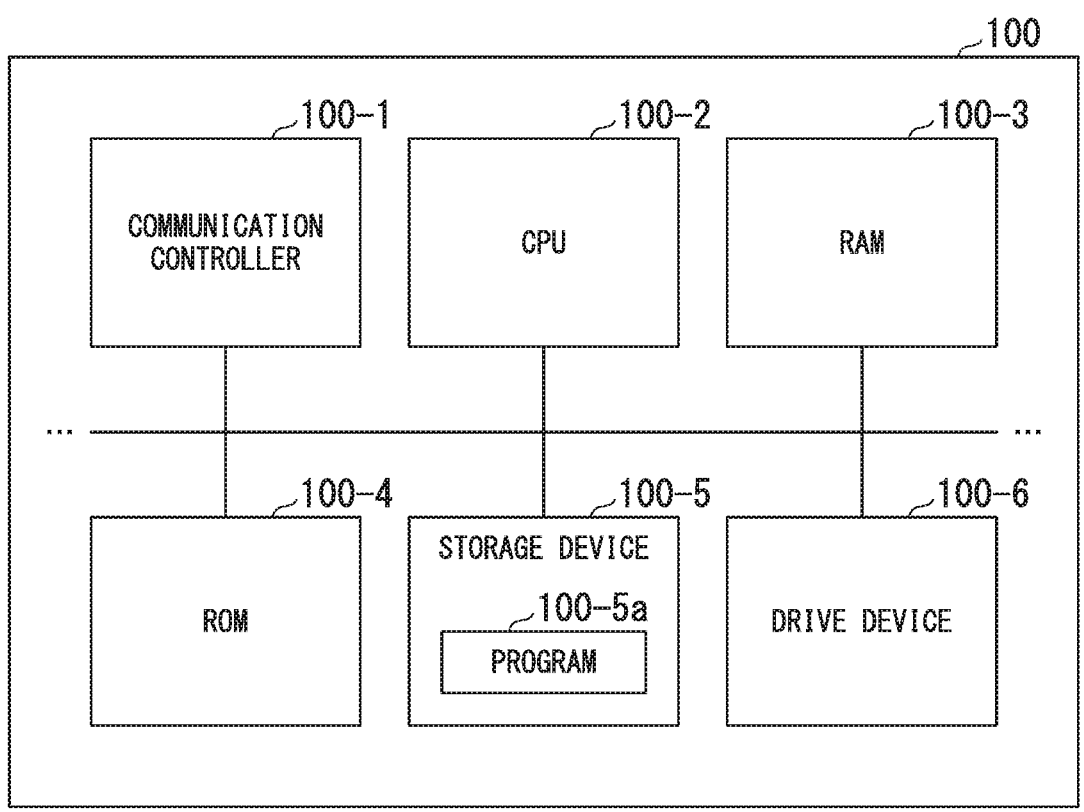
FIG. 11 is a diagram showing one example of the hardware configuration of an automated driving control device according to an embodiment.

FIG. 11 is a diagram showing one example of the hardware configuration of an automated driving control device 100 according to an embodiment. As shown in the drawing, the automated driving control device 100 has a configuration in which a communication controller 100-1, a CPU 100-2, a random access memory (RAM) 100-3 used as a working memory, a read only memory (ROM) 100-4 storing a boot program and the like, a storage device 100-5 such as a flash memory or an hard disk drive (HDD), a drive device 100-6, and the like are interconnected through an internal bus or a dedicated communication line. The communication controller 100-1 communicates with constituent elements other than the automated driving control device 100. A program 100-5a executed by the CPU 100-2 is stored in the storage device 100-5. This program is expanded into the RAM 100-3 by a direct memory access (DMA) controller (not shown in the drawing) or the like and is executed by the CPU 100-2. In this way, some or all of the recognizer 130, the action plan generator 140, and the second controller 160 are realized.

The embodiment described above can be represented as below.

A vehicle control device including a storage device storing a program and a hardware processor and configured such that the hardware processor, by executing the program stored in the storage device, recognizes a surroundings status of a vehicle, controls an acceleration and steering of the vehicle on the basis of the recognized surroundings status, in a case in which a plurality of pedestrians are recognized in an advancement direction of the vehicle, executes follow control for following the plurality of pedestrians, and determines details of the follow control on the basis of the behavior of a nearest pedestrian who is closest to the vehicle among the plurality of pedestrians and the behavior of a second pedestrian who is a monitoring target other than the nearest pedestrian among the plurality of pedestrians.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control system comprising:
    a processor; and
    a memory storing executable instructions that, when executed by the processor, facilitate performance of operations, comprising:
    recognizing a surrounding of a vehicle, wherein the surrounding includes a plurality of pedestrians present in an advancement direction of the vehicle, on a first side in a first lateral direction in a road on which the vehicle is traveling, and walking in the advancement direction of the vehicle; and
    controlling an acceleration and steering of the vehicle based on the surrounding, wherein
    in response to recognizing that a first pedestrian included in the plurality of pedestrians being a nearest pedestrian closest to the vehicle and a second pedestrian included in the plurality of pedestrians being present immediately in an advancement direction of the first pedestrian and not being present within a reference distance from the first pedestrian, maintaining a first distance between the first pedestrian and the vehicle,
    in response to recognizing that the first pedestrian is walking at a first speed and the second pedestrian included in the plurality of pedestrians is walking at a second speed, wherein the second speed is lower than the first speed, and wherein the second pedestrian is present immediately in the advancementdirectionofthe-firstpedestrianandwithinthereferencedistancefromthe-first pedestrian, maintaining a second distance between the first pedestrian and the vehicle, wherein the second distance is longer than the first distance,
    in response to recognizing that the first pedestrian is walking at the first speed and the second pedestrian included in the plurality of pedestrians is walking at a third speed, wherein the third speed is greater than the first speed and the second pedestrian is present immediately in the advancement direction of the first pedestrian and within the reference distance from the first pedestrian, maintaining a third distance between the first pedestrian and the vehicle, wherein the third distance is shorter than the second distance, and
    based on the first speed and the second speed, determining a time when the first pedestrian overtakes the second pedestrian and moving the vehicle in a second lateral direction opposite to the first side based on the time.

2. The vehicle control system according to claim 1, wherein the operations further comprise following the nearest pedestrian based on a fourth distance between the nearest pedestrian and the second pedestrian representing a monitoring target being equal to or greater than a predetermined distance.

3. The vehicle control system according to claim 2, wherein, based on the fourth distance being equal to or greater than the predetermined distance, the operations further comprise determining details of a follow control for following the plurality of pedestrians based on a first behavior of the nearest pedestrian without taking a second behavior of the second pedestrian into account.

4. The vehicle control system according to claim 1, wherein, based on a fifth speed associated with the second pedestrian representing a monitoring target being less than the first speed of the nearest pedestrian by a predetermined speed, the operations further comprise changing details of a follow control for following the plurality of pedestrians.

5. The vehicle control system according to claim 4, wherein, in response to changing the details of the follow control, changing a first inter-vehicle distance between a reference position set for the plurality of pedestrians and the vehicle from a second inter-vehicle distance to a third inter-vehicle distance that is longer than the second inter-vehicle distance, or changing an acceleration or a speed of the vehicle from a first degree to a second degree, wherein the second degree is lower than the first degree.

6. The vehicle control system according to claim 1, wherein, based on a change of a relative speed between the nearest pedestrian and the second pedestrian representing a monitoring target changing by more than a predetermined speed, the operations further comprise moving the vehicle in a third lateral direction.

7. The vehicle control system according to claim 6, wherein the operations further comprise moving the vehicle in a direction opposite to a side on which the nearest pedestrian has deviated onto a road.

8. The vehicle control system according to claim 1, wherein the second pedestrian is positioned in front of the nearest pedestrian.

9. The vehicle control system according to claim 8, wherein the operations further comprise excluding pedestrians not present within a specific range acquired by extending a width area set for the nearest pedestrian in the advancement direction of the vehicle from other pedestrians representing monitoring targets.

10. The vehicle control system according to claim 1,
    wherein other pedestrians representing monitoring targets are a third pedestrian positioned in front of the nearest pedestrian and a fourth pedestrian present immediately before the third pedestrian, and
    wherein, based on the third pedestrian and the fourth pedestrian satisfying a first specific condition, and the nearest pedestrian and the third pedestrian satisfying a second specific condition, wherein the second specific control is more attainable than the first specific condition, the operations further comprise changing details of a follow control for following the plurality of pedestrians.

11. A vehicle control method using a vehicle control device, the vehicle control method comprising:
  recognizing a surrounding of a vehicle, wherein the surrounding includes a plurality of pedestrians present in an advancement direction of the vehicle, on a first side in a first lateral direction in a road on which the vehicle is traveling, and walking in the advancement direction of the vehicle; and
  controlling an acceleration and steering of the vehicle based on the surrounding; wherein
  in response to recognizing that a first pedestrian included in the plurality of pedestrians being a nearest pedestrian closest to the vehicle and a second pedestrian included in the plurality of pedestrians being present immediately in an advancement direction of the first pedestrian and not being present within a reference distance from the first pedestrian, maintaining a first distance between the first pedestrian and the vehicle,
  in response to recognizing that the first pedestrian is walking at a first speed and the second pedestrian included in the plurality of pedestrians is walking at a second speed, wherein the second speed is lower than the first speed, and wherein the second pedestrian is present immediately in the advancement direction of the first pedestrian and within the reference distance from the first pedestrian, maintaining a second distance between the first pedestrian and the vehicle, wherein the second distance is longer than the first distance,
  in response to recognizing that the first pedestrian is walking at the first speed and the second pedestrian included in the plurality of pedestrians is walking at a third speed, wherein the third speed is greater than the first speed and the second pedestrian is present immediately in the advancement direction of the first pedestrian and within the reference distance from the first pedestrian, maintaining a third distance between the first pedestrian and the vehicle, wherein the third distance is shorter than the second distance, and
  based on the first speed and the second speed, determining a time when the first pedestrian overtakes the second pedestrian and moving the vehicle in a second lateral direction opposite to the first side based on the time.

12. A non-transitory computer-readable storage medium that stores a computer program to be executed by a computer to perform at least:
  recognize a surrounding of a vehicle, wherein the surrounding includes a plurality of pedestrians present in an advancement direction of the vehicle, on a first side in a first lateral direction in a road on which the vehicle is traveling, and walking in the advancement direction of the vehicle; and
  control an acceleration and steering of the vehicle based on the surrounding; wherein
  in response to recognizing that a first pedestrian included in the plurality of pedestrians being a nearest pedestrian closest to the vehicle and a second pedestrian included in the plurality of pedestrians being present immediately in an advancement direction of the first pedestrian and not being present within a reference distance from the first pedestrian, maintain a first distance between the first pedestrian and the vehicle,
  in response to recognizing that the first pedestrian is walking at a first speed and the second pedestrian included in the plurality of pedestrians is walking at a second speed, wherein the second speed is lower than the first speed, and wherein the second pedestrian is present immediately in the advancement direction of the first pedestrian and within the reference distance from the first pedestrian, maintain a second distance between the first pedestrian and the vehicle, wherein the second distance is longer than the first distance,
  in response to recognizing that the first pedestrian is walking at the first speed and the second pedestrian included in the plurality of pedestrians is walking at a third speed, wherein the third speed is greater than the first speed and the second pedestrian is present immediately in the advancement direction of the first pedestrian and within the reference distance from the first pedestrian, maintain a third distance between the first pedestrian and the vehicle, wherein the third distance is shorter than the second distance, and
  based on the first speed and the second speed, determine a time when the first pedestrian overtakes the third pedestrian and move the vehicle in a second lateral direction opposite to the first side based on the time.

\* \* \* \* \*